United States Patent Office 2,851,006
Patented Sept. 9, 1958

2,851,006
HATCHING OF EGGS

Welton I. Taylor, Chicago, and John H. Silliker, Park Forest, Ill., assignors to Swift & Company, Chicago, Ill., a corporation of Illinois No Drawing. Application November 3, 1955
Serial No. 544,841

7 Claims. (Cl. 119—1)

This invention provides a method for increasing the percentage hatch of fowl eggs.

It has been long appreciated that the eggs of diseased flocks of chickens, turkeys, ducks, and other poultry have a lower percentage hatch than eggs from healthy flocks and that the chicks, ducklings, and turkey poults of the diseased eggs were frequently weak and a source of infection for other fowl that eventually came into contact with them. As a result, most hatcheries will only set eggs of tested flocks. In spite of this precaution, the danger always exists that an outbreak of salmonellosis in its various forms or other bacteria-caused disease may occur subsequent to testing of a flock and the eggs of the flock will then be unsuitable for hatching. Another shortcoming is that the serological tests employed are reliable diagnostic aids only during the late or convalescent periods of the acute diseases. Thus, there is always the likelihood that even the eggs of a tested flock are infected with one or more of the harmful bacteria.

There is a decided need for a positive control of these various bacteria-caused diseases that are transferred through the eggs of fowl. The measures employed today are principally precautionary in nature and it cannot be said with certainty with respect to any batch of eggs that it is free of objectionable bacteria. Through the practice of the method of our invention, eggs can be treated and when so treated, it can be said with assurance that the treated eggs are free of any objectionable bacteria for which they have been treated. Our method will permit the use for hatching purposes of eggs from infected flocks and these initially infected eggs will have a percentage hatch favorably comparable to eggs from a tested flock. Furthermore the young birds, even though they should be hatched from eggs once infected, will be strong and healthy. Our process also obviates the risk of introducing potentially infected chicks, ducklings, or turkey poults into healthy flocks.

In out method, we introduce a small quantity of a selected bacteriophage, which is known to destroy the particular objectionable bacteria for which the eggs are being treated, through the shell of the whole egg and then incubate the treated egg. Various procedures are available for introducing the bacteriophage to the interior of the egg. A hypodermic syringe may be used. Another procedure consisting of setting up a pressure differential across the shell of the eggs, with the greater pressure being on the exterior, and utilizing this pressure differential to pass the bacteriophage through the pores of the egg shell into the magma of the egg. The pressure differential may be set up by use of a pressure chamber or by creating a temperature differential between the eggs and a fluid medium which contains the bacteriophage and in which the eggs are submerged. It is contemplated that the jet or high-pressure spray technique that is in use for introducing medicaments through the human skin may be used to inoculate the whole egg with the bacteriophage. This technique is disclosed in the United States patents to Sherer, No. 2,704,542 and to Ziherl et al., No. 2,687,724.

In the use of a pressure chamber, the eggs are immersed in a liquid medium containing the bacteriophage and a pressure applied on the surface of the liquid for a brief period of time, the length of time being inversely related to the degree of pressure used. We have found that one atmosphere of pressure for five minutes is satisfactory. Lower pressures may be employed with longer intervals of time.

As mentioned before, a temperature differential between the egg being treated and the liquid medium containing the phage will create a differential pressure across the shell of the egg whereby the bacteriophage will pass into the egg under the influence of suction. It has been our experience that the eggs should not be heated to a temperature much in excess of 80° F.; otherwise the embryos will be injured. It is best that the temperature differential not exceed about 40° F. and be within the range of say 10° F. to 40° F., with the liquid medium being held at the lower temperature than the eggs.

It is not necessary that the treated eggs be held for a period of time before incubation as the bacteriophage are active at the incubation temperature.

For each genus of bacteria, such as Salmonella or coliform, there are many species. It has been estimated that the number of identifiable Salmonella species are in excess of 140 and within the species, there are many strains. For classification purposes, the species of Salmonella have been broken down into 7 groups. For each strain of phage, there is a host species of Salmonella upon which it will thrive and, in some instances, there are "wide spectrum" strains of phages which will live off several species of Salmonella, and in some instances, the spectrum is wide enough to encompass Salmonella species falling within different groups. We have obtained one strain of phages which is capable of living off some 97% of the known Salmonella species. In addition, we have isolated other phage strains of different spectra. The use of this extremely "wide spectrum" Salmonella phage usually kills all of the Salmonella, but in order to assure the destruction of all possible species of Salmonella other phages, having different spectras, may be used along with the latter phage.

The first step in the isolation of a desirable bacteriophage is the obtaining of an original source of the phage. We prefer and utilize a source consisting of 50% raw sewage and 50% return aeration mixture (returned sludge). To a portion of this source material, there is introduced a 4 hour broth culture of the particular strain of bacterium which it is desired to kill in the egg material. It will be seen that the adding of the particular bacterium strain to the sewage will encourage the growth of the bacteriophage which lives on it as a parasite. The sewage is held at 37° C. in an incubator throughout this period. After inoculating the sewage daily for a week or so, it is passed through a bacteria filter. The filtrate will contain the bacteriophage. The filter is of a size which permits the passage of the phages but not of the bacteria. The filtrate should have some of the desired phages providing, of course, some of that phage was originally present in the raw sewage.

The filtrate is inoculated with a 4 hour broth culture of the host bacterium upon which the desired phage lives, and the filtrate is incubated at 37° C. overnight. The next morning, the liquid is filtered again to remove the phage-resistant bacteria, that is, the bacteria which did not succumb to the attack of the phage. It will be readily seen if the phage-resisant bacteria were not removed, they would thrive on the broth culture introduced and in time reach an overwhelming number. The filtrate again is inoculated with the selected species of the bacterium for which it is desired to isolate a bacteriophage. Here, as before, the bacterium is introduced in a 4 hour broth culture. After the second introduction, the liquid will likely clear within a half hour or so indicating an extremely high phage count and few residual bacteria. A clear liquid indicates the presence of phage and the absence of bacteria as the latter gives a cloudy appearance to the liquid. Some phage filtrates will only require two or three days to reach this state while others may take as long as two to three weeks. The phage filtrate so prepared may be preserved by refrigeration storage.

The particular phage which has been isolated as described above is fed various strains of bacteria to determine the width of its spectrum. As mentioned above, some strains of phage, for example, a Salmonella phage, may be capable of destroying several species of bacteria within the genus Salmonella, and even some species from closely related genera.

It is estimated that the strength of the phage filtrate described above is on the order of 20 billion particles (phages) per milliliter.

The following examples are illustrative of the method of the present invention and are not to be construed as limiting the scope of the invention.

*Example I*

*Salmonella chittagong* was used to infect 261 eggs by placement of the eggs at 78° F., in a chilled broth culture of the organism at about 40° F. for 10 minutes. The eggs were then held for 18 hours at which time 123 of the infected eggs were placed in a polyvalent Samonella phage containing liquid having a temprature of 40° F. for 10 minutes to introduce the phage. The eggs at the time of placement in the liquid had a temperature of roughly 78° F. In addition to the 261 infected eggs, there was a control of 128 uninfected eggs. The three batches of eggs were placed in an incubator and set for 22 days. The unhatched eggs were broken out and the infertile eggs counted. The results are reported in the table below:

| Group Tested | No. Hatched, No. Set | Infertile | Percent Hatch | |
|---|---|---|---|---|
| | | | All Set | Fertile Only |
| Controls | 81/128 | 18 | 63.3 | 73.6 |
| Infected | 55/138 | 22 | 39.8 | 47.4 |
| Infected+Phage | 75/123 | 16 | 60.9 | 70.1 |

As will be seen from the table above, the infected eggs which were later treated with the bacteriophage had a percentage hatch favorably compared to the uninfected control. The infected eggs which received no bacteriophage had a much lower percentage of hatch and it was observed that the chicks that did hatch were weaker and less healthy.

*Example II*

212 eggs received an inoculum of *Salmonella typhimurium* by the following technique. A hypodermic syringe containing a broth culture of that organism having approximately 1,000,000 cells per milliliter was used to inoculate the eggs of the test. The eggs were first swabbed with a cotton swab dipped in 2% tincture of iodine and allowed to dry. The needle, 26 gauge, short shank, was inserted at an oblique angle to the shell into the albumen and 0.1 ml. of the broth was injected. The hole was sealed with a cellulose tape patch, although a drop of melted paraffin would have worked equally as well. One-half of the eggs then received a second injection approximately one hour later of 0.1 ml. of a phage filtrate. All of the eggs were then incubated and, in 22 days, the following results were tabulated:

| Group Tested | No. Hatched, No. Set | Infertile | Percent Hatch | |
|---|---|---|---|---|
| | | | All Set | Fertile Only |
| Infected | 43/106 | 10 | 40.5 | 44.7 |
| Infected+phage | 74/106 | 13 | 69.8 | 79.5 |

*Example III*

*Salmonella pullorum* was employed to infect 248 eggs by the expedient of immersing the eggs, 19 at a time, in 6 hour broth cultures of that organism in a pressure chamber. The pressure of the chamber was raised over a period of 45–60 seconds to 15 pounds and maintained at such pressure for five minutes. The pressure was then reduced to atmospheric over approximately 30 seconds.

One-half of the infected eggs then received an identical treatment in which bacteriophage parasitic to *Salmonella pullorum* was used as the menstruum in which the eggs were immersed.

The eggs were set and at 22 days, as in the other examples, all of the unhatched eggs were broken and the following results tabulated:

| Group Tested | No. Hatched, No. Set | Infertile | Percent Hatch | |
|---|---|---|---|---|
| | | | All Set | Fertile Only |
| Infected | 47/124 | 16 | 37.9 | 43.5 |
| Infected+phage | 82/124 | 18 | 66.1 | 77.4 |

It will be noted that in the above examples that the lysozyme of the albumen was evidently not active against the bacteriophage. It had been feared that this enzyme which naturally occurs in eggs might neutralize or possibly destroy the phage. This did not occur.

Obviously, many modifications and variations of the invention as hereinbefore set forth may be made without departing from the spirit and scope thereof, and therefore only such limitations should be imposed as are indicated in the appended claims.

We claim:
1. An egg containing added Salmonella bacteriophage.
2. A hatching egg of high percentage of hatch characteristic having in the magma thereof a small quantity of added bacteria-destroying bacteriophage.
3. The egg of claim 2 wherein the bacteria-destroying bacteriophage is Salmonella bacteriophage.
4. The egg of claim 3 wherein the Salmonella bacteriophage is *Salmonella pullorum* phage.
5. The egg of claim 3 wherein the Salmonella bacteriophage is *Salmonella typhimurium* phage.
6. The egg of claim 3 wherein the Salmonella bacteriophage is *Salmonella chittagong* phage.
7. A fertile whole fowl's egg having in the magma thereof a small quantity of added Salmonella bacteriophage, said egg being resistant to Salmonella species disease.

References Cited in the file of this patent
UNITED STATES PATENTS

| 2,477,752 | Kiss | Aug. 2, 1949 |
| 2,595,808 | Napper | May 6, 1952 |
| 2,734,482 | Seltzer | Feb. 14, 1956 |

OTHER REFERENCES

Inactivation of Antistreptococcus Bacteriophage by Animal Fluids, by Alice C. Evans, published in the Public Health Reports, vol. 48, no. 16, April 21, 1933, page 411.

UNITED STATES PATENT OFFICE
CERTIFICATE OF CORRECTION

Patent No. 2,851,006                                  September 9, 1958

Welton I. Taylor et al.

It is hereby certified that error appears in the printed specification of the above numbered patent requiring correction and that the said Letters Patent should read as corrected below.

Column 1, line 30, for "adis" read -- aids --; column 3, line 8, for "filtrates" read -- filtrate --; line 28, for "780 F." read -- 78° F. --; line 32, for "temprature" read -- temperature --; column 4, line 22, for "menstruum" read -- menstrum --.

Signed and sealed this 25th day of November 1958.

(SEAL)
Attest:

KARL H. AXLINE                                      ROBERT C. WATSON
Attesting Officer                                   Commissioner of Patents